Patented May 15, 1951

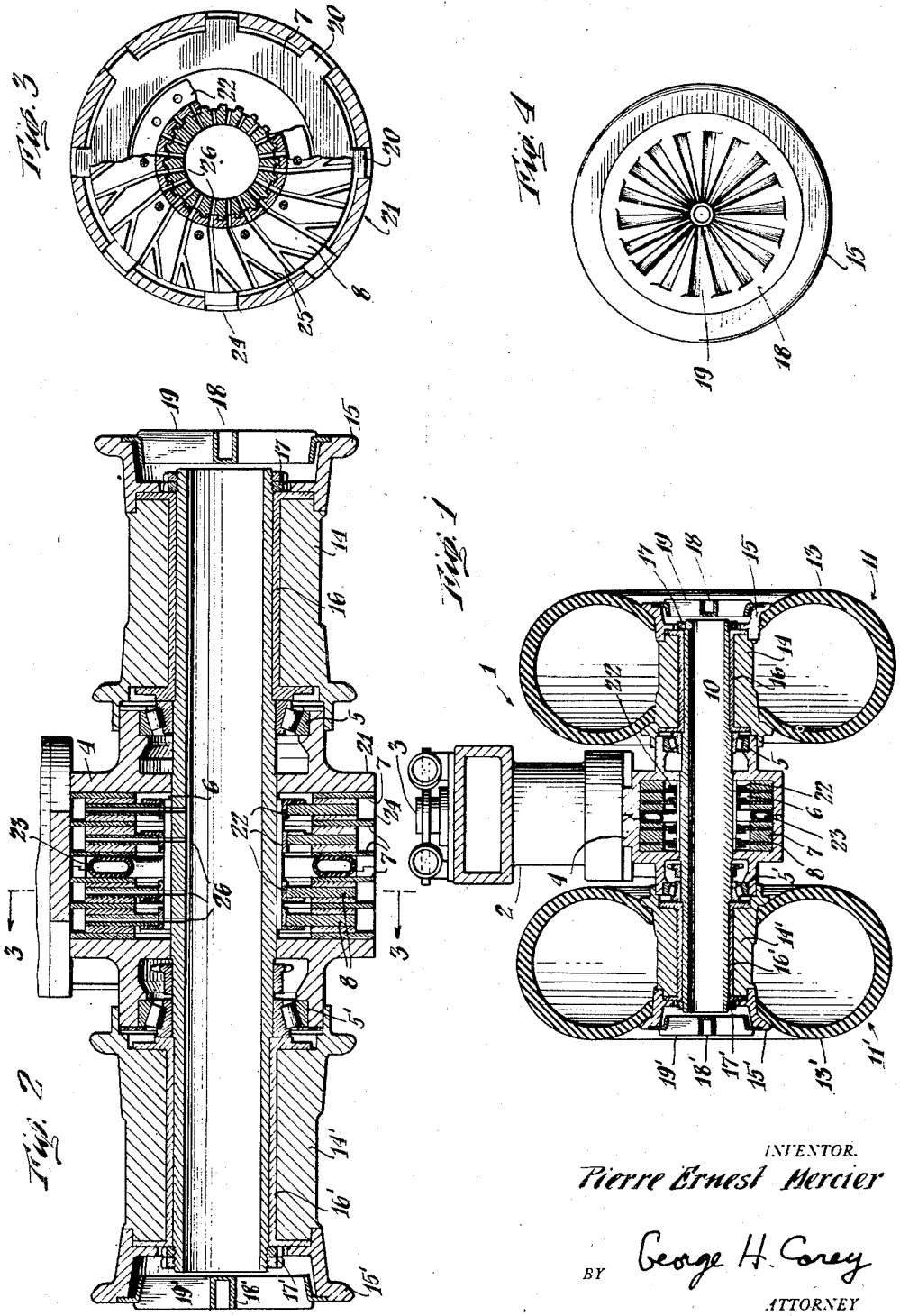

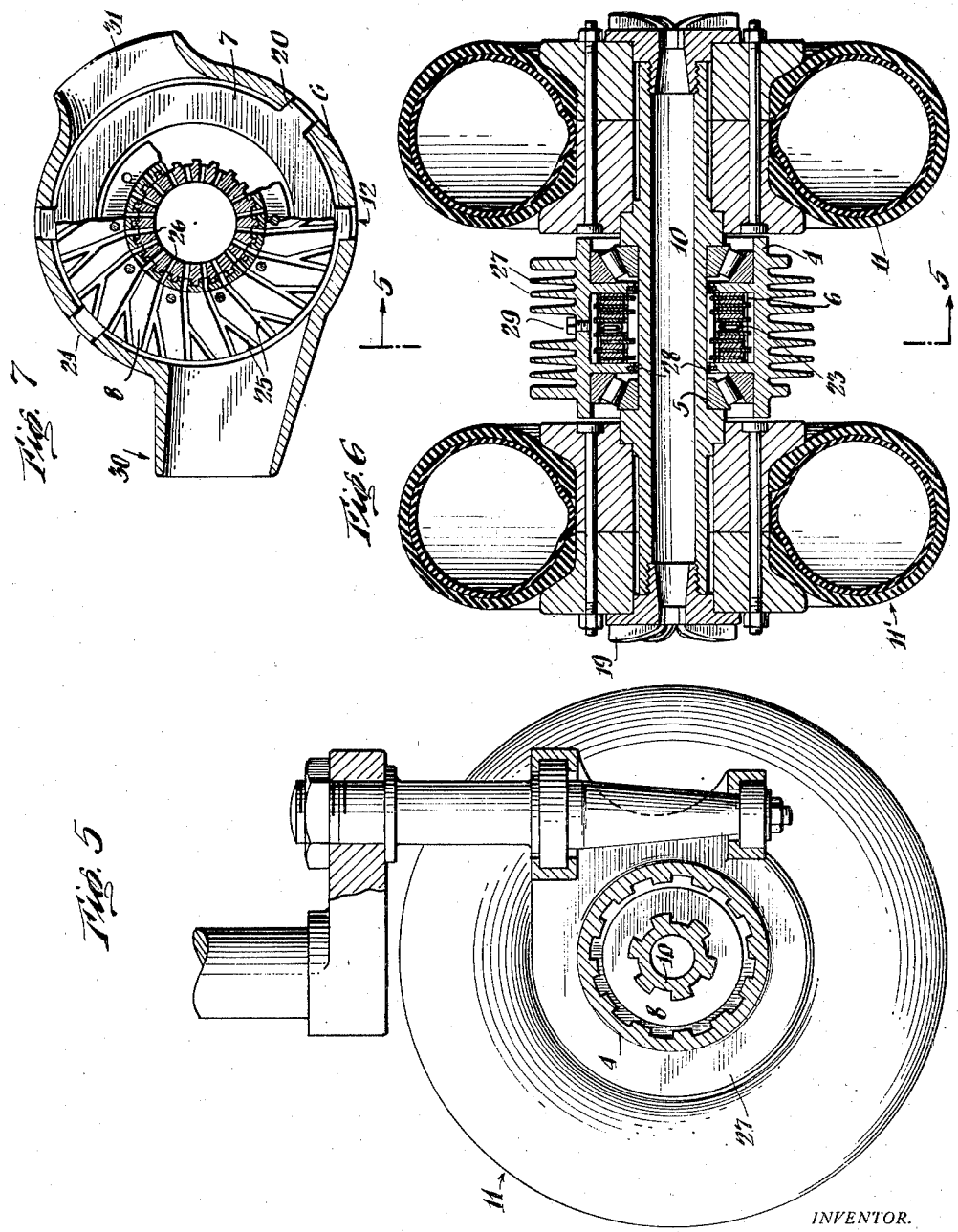

2,552,571

UNITED STATES PATENT OFFICE 2,552,571

AIRCRAFT BRAKE COOLING MEANS

Pierre Ernest Mercier, New York, N. Y.

Application June 1, 1946, Serial No. 673,811

15 Claims. (Cl. 188—264)

This invention relates to landing gear for aircraft and more particularly to such landing gear provided with braking means and means for cooling the braking means.

The temperature to which the brake mechanism of an aircraft landing gear may rise during the braking action is determined to a great extent by the weight of the brake mechanism. Although a large mass or weight of material in the structure is capable of absorbing a large amount of heat without dangerous rise of temperature it is important to keep the weight of the brake mechanism as low as possible inasmuch as, among other reasons, such weight lessens the possible load which the aircraft may carry in flight. The advantage of light weight may be gained by providing means for cooling the brake mechanism.

An object of the invention is to provide an aircraft landing gear brake mechanism with cooling means whereby the heat generated by the braking action is dissipated quickly, thus permitting the parts of the brake mechanism to be of light construction.

It is a further object of the invention to provide means deriving its energy from the rotation of the landing wheel to cause air or other fluid to flow in cooling relation to the brake mechanism and other parts of the landing gear.

It is a still further object of the invention to provide cooling means, which may be associated with means above referred to, for cooling the housing of the brake mechanism.

In accordance with the present invention the foregoing objects are accomplished by providing an aircraft landing gear having a landing wheel shaft carrying brake disks which coact with brake disks mounted on the frame of the landing gear, the shaft being utilized as a means of dissipating a large portion of the heat generated by the braking action.

The brake mechanism cooling structure may take a variety of forms; for example, cooling may be accomplished by air forced through a duct provided in the shaft on which the landing wheel or wheels are mounted. This air may be delivered by vanes mounted in the hub of the landing wheel or wheels. Alternately, the air may be drawn in or forced in from each end of the duct in the shaft and may be forced through openings in the shaft into contact with the brake disks and the brake housing to cool these parts. In place of, or auxiliary to, such means fins may be provided on the housing to cool the housing by radiation and convection in the stream of air set into motion by the propellers of the aircraft or by the movement of the aircraft through the air, the cooling of the brake mechanism being effected by conduction through the parts over which the air flows. A fluid may be confined in the chamber formed in the housing surrounding the brake disks and the shaft, this fluid serving to transfer the generated heat away from the source of generation, i. e., from the friction surfaces of the brake disks to the housing or to the radiation fins. Combinations of the above forms may be utilized.

Other objects and features of the invention will become apparent from the description now to be given in reference to the accompanying drawings, in which Fig. 1 is a longitudinal sectional elevational view of a landing gear brake mechanism constructed in accordance with the invention;

Fig. 2 is an enlarged view of a slightly modified brake mechanism corresponding to the view in Fig. 1;

Fig. 3 is a cross sectional view taken along the line 3—3 of Fig. 2 showing the air passageways in the brake disks which permit air to flow from the shaft through the brake mechanism;

Fig. 4 is a side view of a landing gear showing the vanes in the hub of a wheel to force air through the shaft;

Fig. 5 is a cross sectional view through a slightly modified form of brake mechanism taken along the line 5—5 of Fig. 6;

Fig. 6 is a longitudinal sectional view of a brake mechanism showing radiation fins about the brake mechanism housing;

Fig. 7 is a cross sectional view through a modified form of brake mechanism showing air scoop means for forcing air through the shaft and brake disks.

Referring to Fig. 1 there is shown an aircraft landing gear assembly 1, including a supporting member 2 which may be provided with an extension for mounting the landing gear assembly on an aircraft. A steering shaft 3 extends from a wheel frame 4 through the supporting member 2. The wheel frame is provided with shaft supporting means such as roller bearings 5 and 5′. The wheel frame is further provided with a brake chamber 6 in which are carried brake disks 7 and 8. A wheel shaft 10 is journalled in bearings 5 and 5′. Wheels 11 and 11′ include tires 13 and 13′ mounted on wheel rims 14 and 14′. The tires are replaceably held in position on the rims by rim flanges 15 and 15′. The wheels are rigidly fastened upon sleeves 16 and 16′ which are held against shoulders formed on the wheel shaft 10. The rim flanges 15 and 15' are held in place and the rims 14 and 14' are retained on the shaft 10 by locking means, such as rings 17 and 17'. Hub caps 18 and 18' are formed with vanes 19 and 19' as shown in the side view on Fig. 4. In the construction shown in Fig. 1 the vanes are arranged so that, upon forward rotation of the wheel, air will be forced through the duct in the hollow shaft thus cooling the shaft.

The brake disks in Figs. 1, 2, 3, 6 and 7 are similar in structure. The disks are formed of plates having a friction providing surface, one set of the disks is mounted for rotation with the shaft, while the other set of the disks is mounted so as to be held against rotation in the frame. The frame disks 7 are provided with outwardly projecting portions 20, Fig. 3, meshing into longitudinal grooves or slots 12 in the brake chamber wall 21. The shaft brake disks 8 are attached to flanged rings 22 which are mounted for rotation with the shaft. Both sets of disks are slidable along the longitudinal axis of the wheel shaft. A hollow annular expansible ring 23 is placed centrally in the assembly of alternately arranged disks. The ring 23 is adapted to be expanded by hydraulic pressure to force the disks into frictional contact to provide braking action. The expansible ring 23 may be connected to a hydraulic system of any usual design. Although the shaft brake disks 8 for all of the forms of construction illustrated may be alike in design, it is preferred that the disks used in the construction shown in Figs. 2, 3 and 7 be formed with passageways or channels 25 which are made by grooving the faces of the disks. The channels 25 are inclined from the radius and may have branch channels extending outwardly towards the periphery of the disk from the main channel, as shown in Fig. 3. The shaft 10, Fig. 2, is provided with apertures or openings 26 through the walls thereof in position for alignment with the channels in the brake disks as shown in detail in Fig. 3.

In the construction shown in Fig. 2, the vanes 19 are effective upon forward rotation of the wheel, to cause a flow of cooling air inwardly from both ends of the shaft through the shaft and through the channels of the brake disks. Apertures 24 are formed in the peripheral wall 21 of the brake chamber to provide outlets for the air.

In Fig. 6, the construction as shown in Fig. 1 is modified by providing gasket means 28 to seal the joint between the walls of brake chamber 6 and shaft 10. A filling opening 29 is provided on the top of the brake chamber. The chamber may be filled with a cooling fluid, such as "Prestone," which is prevented by gaskets 28 from flowing into contact with the bearings 5, 5'. The fluid is circulated by the rotation of the shaft brake disks 8 and, as it is in contact with both sets of brake disks, it conducts heat therefrom to the chamber wall and to radiation fins 27 and to the shaft 10 to be carried away in the air, circulating through the shaft, this air being impelled by vanes 19 as in Fig. 1.

Fig. 7 shows a modified construction in which an air scoop 30 is formed on the front side of the brake chamber 6 and an air outlet 31 is formed on the rear of the chamber. In this form of the invention it is preferable that the wheel shaft, if hollow, be blocked at either side of the brake chamber 6 to prevent the passage of air axially outwardly through the shaft. In this construction the air entering through air scoop 30 flows inwardly through the brake disk air passageways 25 and apertures 26 through the shaft wall and outwardly through apertures 24 and the brake disk passageways 25 on the opposite side, leaving the brake housing through outlet 31.

Although these embodiments of the invention have been described with particular reference to an aircraft landing gear having dual wheels it is understood that the invention is equally applicable to a landing gear in which a single wheel is employed. It is further understood that various combinations of the apparatus may be made, i. e., the radiation fins of Fig. 6, or the air scoop of Fig. 7 may be used on the brake chamber of Fig. 1. Moreover, the brake disks mounted in the brake chamber 6 of the construction shown in Fig. 7 may be so formed and arranged in relation to each other that either with passageways 25 or without these passageways ample space is secured for flow of the air from the air scoop 30 to the outlet 31 between the brake disks. Such flow between the disks may take place, if desired, without passing the air through the shaft 10 itself. In this manner the air flow becomes subdivided and the air is brought into contact with all the heat generating surfaces of the brake.

It will also be understood that the above described embodiments of the invention are illustrative only and that the invention may be applied in many other ways and take forms different from those illustrated. The invention is not to be deemed as limited, therefore, otherwise than as indicated by the appended claims.

This application is a continuation in part of application Serial No. 330,007, filed April 17, 1940, now issued as Patent No. 2,401,364, June 4, 1946.

I claim:

1. An aircraft landing gear having in combination, a frame adapted to be attached to the aircraft and providing shaft supporting means, a hollow shaft carried by and rotatable in said shaft supporting means, a landing wheel mounted on the shaft and rotatable therewith, brake means supported by said frame for applying braking action to the shaft, and air impelling means carried by and driven by said hollow shaft upon rotation thereof to circulate air through the interior of the hollow shaft.

2. An aircraft landing gear having in combination, a frame adapted to be attached to the aircraft and providing shaft supporting means, a hollow shaft carried by and rotatable in said shaft supporting means, a landing wheel mounted on the shaft and rotatable therewith, brake means supported by said frame for applying braking action to the shaft, radiation fins on the frame adjacent the brake means, and air impelling means carried by and driven by said hollow shaft upon rotation thereof to circulate air through the interior of the hollow shaft.

3. An aircraft landing gear having in combination, a frame adapted to be attached to the aircraft and providing shaft supporting means, a hollow shaft carried by and rotatable in said shaft supporting means, a landing wheel mounted on the shaft and rotatable therewith, brake means supported by said frame for applying braking action to the shaft, a chamber enclosing the brake means adapted to retain a cooling fluid in contact with the frame and brake disks and shaft, and air impelling means carried by and driven by said hollow shaft upon rotation thereof to circulate air through the interior of the hollow shaft.

4. An aircraft landing gear having in combination, a frame adapted to be attached to the aircraft and providing shaft supporting means, a hollow shaft carried by and rotatable in said shaft supporting means, a landing wheel mounted on the shaft and rotatable therewith, brake means supported by said frame for applying braking action to the shaft, radiation fins on the frame adjacent the brake means, a chamber enclosing the brake means adapted to retain a cooling fluid in contact with the frame and brake disks and shaft, and air impelling means carried by and driven by said hollow shaft upon rotation thereof to circulate air through the interior of the hollow shaft.

5. An aircraft landing gear having in combination, a housing adapted to be attached to the aircraft and providing shaft supporting means, a hollow shaft carried by and rotatable in said shaft supporting means, landing wheels mounted on the ends of the shaft and rotatable therewith, brake means mounted between said ends of said shaft and acting on and through the shaft to effect braking of said wheels, apertures in the shaft forming air passage means between the interior of the shaft and the brake means, and air impelling means cooperating with said shaft for impelling air through the hollow shaft and through said brake means.

6. An aircraft landing gear having in combination, a housing adapted to be attached to the aircraft and providing shaft supporting means, a hollow shaft carried by and rotatable in said shaft supporting means, landing wheels mounted on the ends of the shaft and rotatable therewith, brake means mounted between said ends of said shaft and acting on and through the shaft to effect braking of said wheels, apertures in the shaft forming air passage means between the interior of the shaft and the brake means, said brake means including brake disks having passages therein aligned with the apertures in the shaft, and air impelling means cooperating with said shaft for impelling air through the hollow shaft and through said passages in said brake disks.

7. An aircraft landing gear having in combination, a housing adapted to be attached to the aircraft and providing shaft supporting means, a hollow shaft carried by and rotatable in said shaft supporting means, landing wheels mounted on the ends of the shaft and rotatable therewith, brake means mounted between the ends of said shaft and acting on and through the shaft to effect braking of said wheels, apertures in the shaft forming air passage means between the interior of the shaft and the brake means, said brake means including brake disks having passages therein aligned with the apertures in the shaft, and vanes in the hubs of the wheels adapted to force air into the hollow shaft upon forward rotation of the wheels.

8. An aircraft landing gear having in combination, a housing adapted to be attached to the aircraft and providing shaft supporting means, a hollow shaft carried by and rotatable in said shaft supporting means, landing wheels mounted on the ends of the shaft and rotatable therewith, brake means mounted in the housing between the ends of said shaft and acting thereon for applying braking action to said wheels, and an air scoop on the front of the housing in communication with the brake means through the hollow space of the shaft to impel air in heat exchange relation with the braking means.

9. An aircraft landing gear including a brake device having in combination a housing adapted to be attached to the aircraft and providing shaft supporting means, a shaft carried by and rotatable in said shaft supporting means, a rotatable wheel element carried by and rotatable with said shaft, brake disks chambered in the housing and cooperating therewith and with said shaft for applying braking action to said shaft, the brake disks having channels formed in the faces thereof for passage of air, and an air scoop formed on the front side of the housing and communicating with said channels, whereby air is impelled through the brake disk air channels for cooling of said brake device.

10. An aircraft landing gear having in combination a frame adapted to be attached to the aircraft, shaft supporting means in the frame formed to support a shaft at spaced bearing points, a hollow shaft carried by and rotatable in the shaft supporting means, landing wheels rigidly mounted on said shaft at the respective ends of the shaft and rotatable therewith, brake means mounted on said frame for applying braking action to said shaft between the spaced bearing points of the shaft supporting means, said brake means including alternate disks one group of which is carried by the frame, the other group of which is carried by the shaft, at least some of said disks being mounted for longitudinal movement with reference to others along the axis of the shaft and being adapted to coact to provide the braking action, means for applying pressure to the groups of brake disks to cause said braking action, a plurality of vanes in the hubs of the wheels at the ends of said shaft, and air communication means between the vanes and brake disks through said hollow shaft, whereby upon rotation of the wheels air may be forced by the vanes through the hollow shaft to ventilate the brake disks.

11. An aircraft landing gear having in combination a frame adapted to be attached to the aircraft, shaft supporting means in the frame formed to support a shaft at spaced bearing points, a shaft carried by the shaft supporting means, landing wheels rigidly mounted on said shaft at the respective ends of the shaft and rotatable therewith, brake means mounted in said frame for applying braking action to said shaft between the spaced bearing points of the shaft supporting means, said brake means including alternate disks one group of which is carried by the wheel frame, the other group of which is carried by the shaft, at least some of said disks being mounted for longitudinal movement with reference to others along the axis of the shaft and being adapted to coact to provide said braking action, means for applying pressure to the groups of brake disks to cause braking action, air passage means through said disks and said shaft, and an air scoop mounted on the front of said frame in communication with the brake disks whereby upon forward movement of the aircraft air is forced over the brake disks for ventilation of said disks.

12. An aircraft landing gear having in combination a wheel frame adapted to be attached to the aircraft, shaft supporting means in the wheel frame formed to support a shaft at spaced bearing points, a shaft carried and rotatable in the shaft supporting means, landing wheels rigidly mounted on said shaft at the respective ends of the shaft and rotatable therewith, brake means mounted on said frame for applying braking action to said shaft between the spaced bearing points of said shaft supporting means, said brake means including alternate disks one group of which is carried by the wheel frame, the other group of which is carried by the shaft, at least some of said disks being mounted for longitudinal movement with reference to others along the axis of the shaft and being adapted to coact to provide said braking action, and a chamber enclosing the brake disks adapted to retain a cooling fluid in contact with the wheel frame, brake disks and the shaft.

13. An aircraft landing gear having in combination a frame adapted to be attached to the aircraft, shaft supporting means in the frame formed to support a shaft at spaced points of bearing, a hollow shaft carried by and rotatable in the shaft supporting means, landing wheels rigidly mounted on said shaft at the respective ends of the shaft and rotatable therewith, brake means mounted on said frame for applying braking action to said shaft between the spaced points of bearing of the shaft supporting means, said brake means including alternate disks one group of which is carried by the wheel frame, the other group of which is carried by the shaft, at least some of said disks being mounted for longitudinal movement with reference to others along the axis of the shaft and being adapted to coact to provide said braking action, means for applying pressure to the groups of brake disks to cause braking action, and a plurality of vanes in the hubs of the wheels at the ends of said shaft cooperating with said hollow shaft upon rotation of the wheels to force air through and to ventilate and cool the hollow shaft.

14. An aircraft landing gear having in combination a frame adapted to be attached to the aircraft and providing shaft supporting means, a shaft carried by and rotatable in said shaft supporting means, a landing wheel mounted on said shaft and rotatable therewith, brake means supported by said frame for applying braking action to said shaft, means for conveying air in heat exchanging relation to said shaft and to said brake means to effect cooling thereof, and means carried by and driven by said shaft for impelling said air to move in said heat exchanging relation in said conveying means.

15. An aircraft landing gear having in combination, a frame adapted to be attached to the aircraft and providing shaft supporting means, a hollow shaft carried by and rotatable in said shaft supporting means, a landing wheel mounted on said shaft adjacent an end thereof and rotatable therewith, brake means supported by said frame for applying braking action to the shaft at a portion thereof along said shaft from said wheels, and air impelling means cooperating with said hollow shaft to circulate air through the interior of the hollow shaft, said shaft and said brake means being constructed to provide for cooling thereof by said air moving through said shaft.

PIERRE ERNEST MERCIER.

REFERENCES CITED

The following references are of record in the file of this patent:

UNITED STATES PATENTS

| Number | Name | Date |
|---|---|---|
| 854,720 | Dawson | May 28, 1907 |
| 2,020,748 | Waseige | Nov. 12, 1935 |
| 2,165,978 | Miller | July 11, 1939 |
| 2,199,785 | Dickson | May 7, 1940 |
| 2,238,943 | McCune et al. | Apr. 22, 1941 |
| 2,241,193 | Garnett et al. | May 6, 1941 |
| 2,248,684 | Levy | July 8, 1941 |
| 2,380,085 | Tack | July 10, 1945 |
| 2,412,432 | Tack | Dec. 10, 1946 |

FOREIGN PATENTS

| Number | Country | Date |
|---|---|---|
| 742,120 | France | Feb. 28, 1933 |